Aug. 29, 1950   R. STEVENSON   2,520,893
RELIEF VALVE

Filed March 16, 1944   2 Sheets-Sheet 1

INVENTOR
Robert Stevenson
BY Barlow & Barlow
ATTORNEYS

Aug. 29, 1950 R. STEVENSON 2,520,893
RELIEF VALVE
Filed March 16, 1944 2 Sheets-Sheet 2
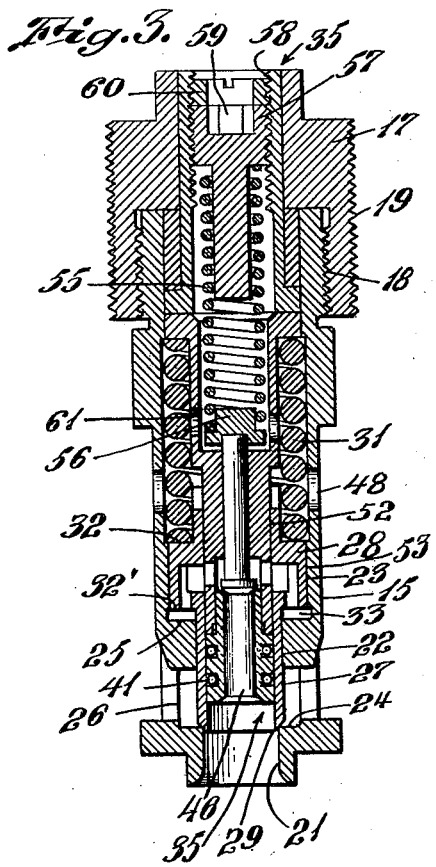
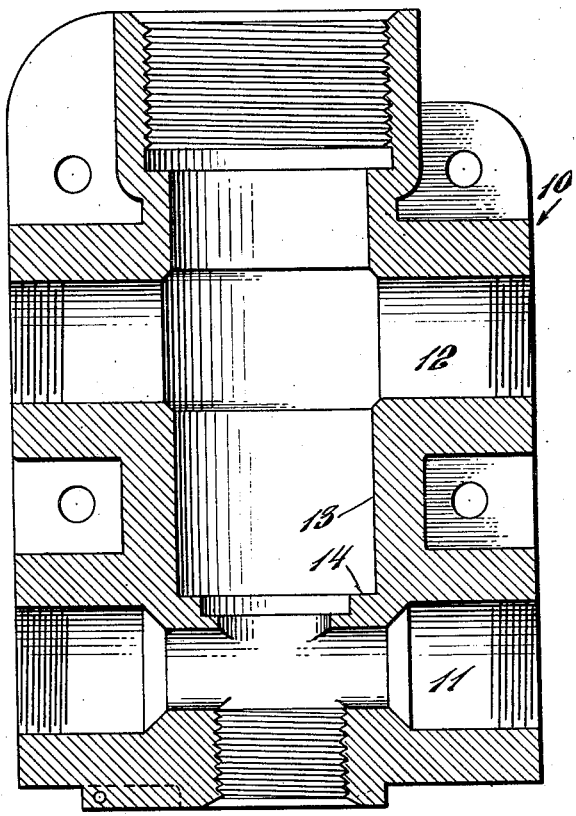
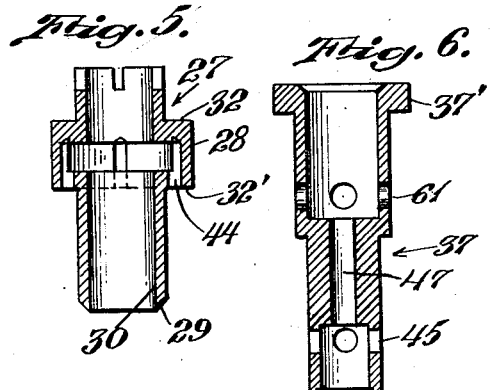
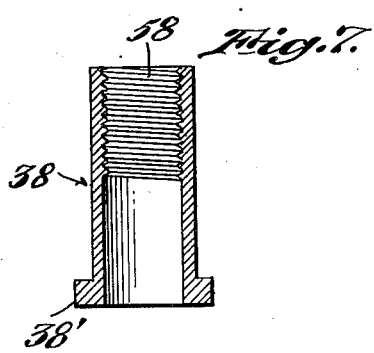
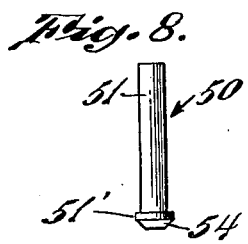
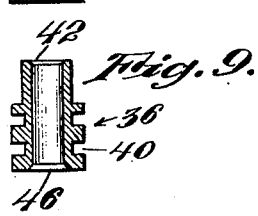
INVENTOR
Robert Stevenson
BY Barlow & Barlow
ATTORNEYS Patented Aug. 29, 1950

2,520,893

UNITED STATES PATENT OFFICE 2,520,893

RELIEF VALVE

Robert Stevenson, Barrington, R. I., assignor to Merit Engineering, Inc., a corporation of Rhode Island Application March 16, 1944, Serial No. 526,673

2 Claims. (Cl. 137—53)

This invention relates to a relief valve to be connected in some fluid system so that the pressure in the conduit may be limited to a certain predetermined value. The valve is adapted to be used on any conduit through which fluid flows whether it be gas or liquid.

In the use of certain relief valves where the main operating valve is subjected to the pressure in the main flow line and this pressure is utilized at the valve seat for opening the valve while a spring is used for closing the valve a certain chattering may occur which is highly undesirable. Further it is found very difficult in high pressure systems to provide a valve which will be accurate over a wide range for opening and closing.

One of the objects of this invention is to provide a construction of relief valve which will be highly sensitive over a wide range and within tolerances desired by the airplane industry.

Another object of this invention is to provide a valve which may be set to open at any selected pressure within a wide range of pressures so that duplicate valves may be used in aircraft where several different pressures are required and which up to the present time have required valves of different construction so that one could not be substituted for another.

Another object of this invention is to provide an assembly, which may be sold stripped and without a casing, to be placed in any housing or opening in a block where it may be desired to be utilized.

Another object of this invention is to provide a valve which will be compact in construction and thus one occupying a minimum amount of space and requiring a minimum weight of material.

Another object of the invention is to provide a relief valve which will not chatter in use.

Another object of the invention is to provide a relief valve utilizing fluid pressure to open the same and in which the construction is such that actuating pressure for opening the valve will be quickly and constantly relieved when it is desired to close the main valve, eliminating a cause of chattering.

Another object of this invention is to control the main valve at a point removed from the location of flow of the fluid past the valve when the same is open, thus stabilizing the action of the main valve by making its control independent of the flow of the fluid which it controls while utilizing the pressure of this fluid for accomplishing the result.

Another object of the invention is to utilize the pressure of the fluid in the main line for actuating a control of the main valve while eliminating the fluctuation in pressure of the fluid controls due to its flow which has been a cause of uncertainty in the operation of valves of this character heretofore.

Another object of the invention is to provide a control valve which will be restricted in its movement a minimum amount, such for example as by absence of packing rings, etc., surrounding it.

Another object of this invention is to provide a control valve for the main valve which control valve is subjected unrestrictedly to the pressure of the main flow conduit which it is to control whereby the full pressure in this conduit will be acting upon the control valve at all times and without any time lag.

With these and other objects in view, the invention consists of certain novel features of construction, as will be more fully described and particularly pointed out in the appended claims.

In the accompanying drawings:

Fig. 3 is a sectional view illustrating the unit assembly stripped from its casing, and adapted to be placed into any housing or opening for the control of fluid through a main flow line with which the bore of the housing or receiving casing may connect.

Fig. 4 is a sectional view of the casing for receiving the unit of Fig. 3;

Figs. 5, 6, 7, 9 are sectional views and Fig. 8 an elevation of detail of the operating parts.

Figure 1:
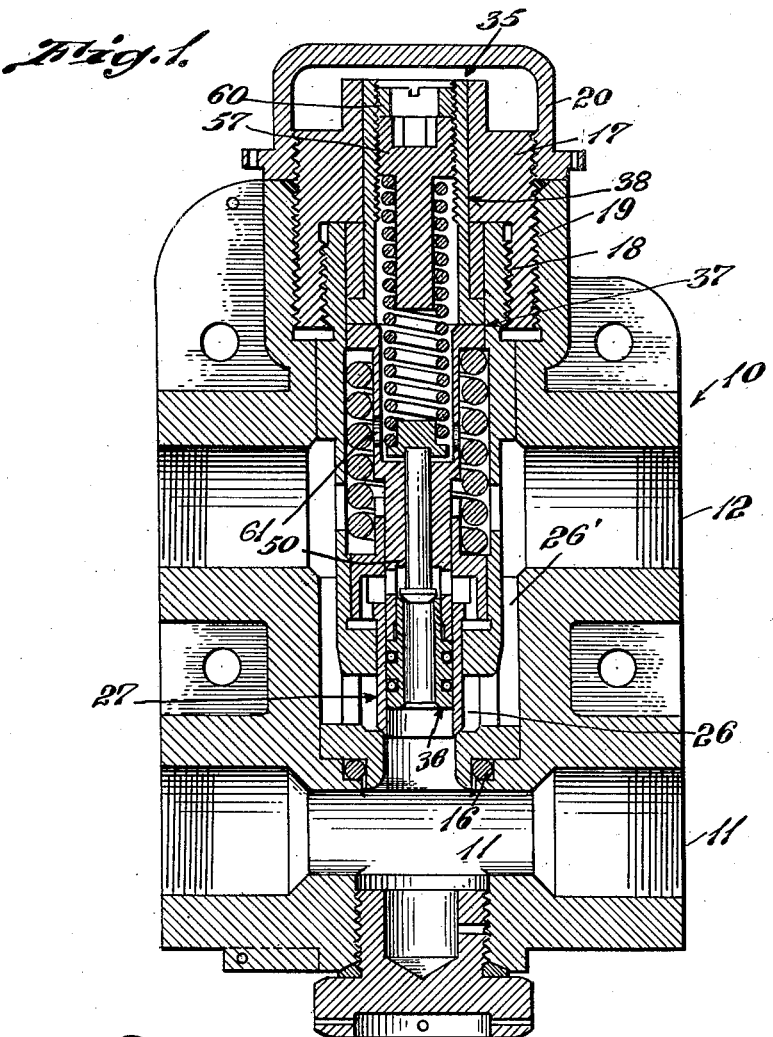
Fig. 1 is a sectional view of the valve in its housing.
Figure 2:
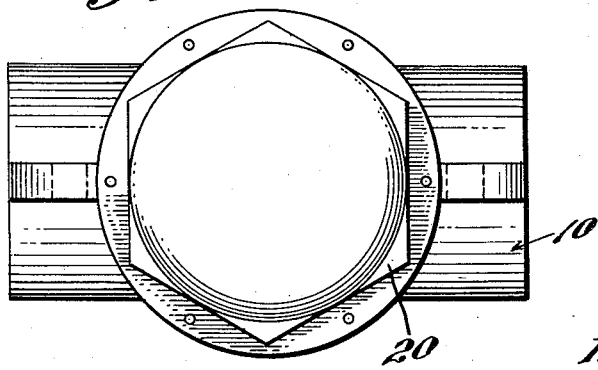
Fig. 2 is a top plan view.

In proceeding with this invention I control an opening to an exhaust port from the main flow line by a main valve so constructed that it is subjected to very little pressure of the main line when normally in closed position. I, also, provide an auxiliary control valve which may be set to open at a predetermined pressure and which is unrestrictedly subjected to the pressure in the main flow line at all times. When this control valve opens the pressure in the main flow line will be transmitted to a chamber so that it will then act upon the main valve to open the main valve. Thus, both valves are acted upon by the main pressure in the main flow line. When the auxiliary or control valve closes the pressure in the chamber is relieved immediately to permit closing of the main valve when the conditions are such that it should be closed. This arrangement makes for very positive action of the main valve and prevents chattering or reciprocation back and forth.

With reference to the drawings, I have shown a casing or housing 10 which has a main flow line 11 and an exhaust port 12. A bore designated generally 13 is provided in the housing or casing and connects the ports 11 and 12, there being a shoulder 14 at a point along this bore between its communication with the conduits 11 and 12.

A complete assembly of operating parts as shown in Fig. 3 is placed into the bore 13 for the control of fluid from the conduit 11 to the exhaust 12 under certain predetermined conditions. This assembly consists of an outer sleeve 15 flanged at its inner end to engage shoulder 14 and is packed as at 16 to provide a tight seal connection with the casing at this lower end. At its upper end it is conveniently formed with a separate section 17 threaded onto it as at 18 and in effect becoming one part therewith, while it is threaded as at 19 to engage the casing to functionally become a solid part of the casing so far as operation is concerned. The threads 19 extend upwardly for the reception of a cap 20 or closure member which also serves as a check nut to bind this part securely in its housing.

The sleeve 15 is provided with internal bores 21, 22, and 23 of progressively increasing diameters, providing shoulders between them. Shoulder 24 provides at its edge a seat for the main valve. Shoulder 25 provides one wall of the pressure chamber to be later described. A plurality of conduits 26 are located at a point above the valve seat or shoulder 24 to provide communication from the bore 21 to the bore 13 and thence along the sleeve 15 as at 26' to the exhaust port 12 (see Fig. 1). A control of the flow from the conduit 11 through these ports 26, 26' to the exhaust port 12 is the purpose of the mechanism.

The main valve 27 (Fig. 5) has its outer surface engaging the bore 22. The enlarged portion of this valve 28 has a loose sliding fit with a portion of the bore 23. Thus these two surfaces guide the movement of the valve 27 in its reciprocating action. The lower end 29 of this valve is provided with a surface to seal with the seat provided by shoulder 24 when pressed into engagement therewith, while the interior diameter 30 of this valve is such that but very little surface is exposed to the high pressure fluid in the conduit 11 as it extends inwardly but a very small amount beyond the bore 21. A spring 31 presses on the shoulder 32 of the enlarged portion 28 of the valve so as to force the valve onto its seat. This spring 31 engages a suitable abutment at its other end. When the valve is on its seat the lower surface 32' of the enlargement 28 is spaced from the shoulder 25 so as to provide a pressure chamber 33 between the surface 32' and the shoulder 25 annularly about the valve.

Inwardly of the valve 27 a guide 35 is provided which is formed of several sections 36, 37, and 38 (Figs. 9, 6, 7) for assembly purposes but which in effect act as a single piece and provide a rigid fixture with the casing. The upper member 38 is fitted within the member 17 and is located in position by a collar 39 interposed between the member 17 and the flange 38'. Section 36 of the guide 35 is shrunk into member 37 and the flanges 37' and 38' are held in engagement by the spring 31, the flange 37' forming an abutment for the upper end thereof. The guide 36 is provided with recesses 40 for the reception of the doughnut packings 41 to provide a tight seal with the valve 27. The upper end of this section 36 provides a valve seat designated 42, with which a control or auxiliary valve engages. Conduit 44 through the enlarged portion of the valve 27 and conduit 45 through the guide communicate with the pressure chamber 33 and with the bore 46 of this guide. The main valve 27 is slidably located between this sleeve 15 and the guide 35, and some leakage along both sliding surfaces is provided for fluid from the pressure chamber 33 to the chamber for spring 31 and from there through port 48 to the exhaust 12.

A control valve 50 (Fig. 8) has a shank 51 to slidably engage the inner bore 47 of the section 37 while it has a head 51' with a tapered end providing an inclined surface 54 for engagement with the valve seat 42. The bore 46 communicates directly with the main flow conduit 11 and thus this valve is subjected to the flow of fluid to this valve and unrestricted pressure of this fluid. A spring 55 through cap 56 presses on the upper end of the valve 50 and the amount of pressure may be adjusted by means of member 57 which may be axially moved to compress or release pressure on the spring, such for instance as by means of threads 58 between it and the guide 38. Recessed angular surfaces 59 are illustrated for this purpose. A check nut 60 will bind the adjustment in position. The pressure of this spring 55 may be varied to adjust the limit of the pressure in the main flow conduit 11.

When it is desired to maintain a certain predetermined pressure in the main flow passageway 11, say for instance 1000 pounds, then the adjustment of the spring 55 will be such that the valve 50 will move upwardly and compress this spring 55 when pressure in excess of 1000 pounds occurs in the conduit 11. The valve 50 opens at seat 42 permitting the fluid to pass upwardly through the bore 46 through the passages 45, 44 to the pressure chamber 33 so that this pressure of the main conduit will be applied to the surface 32' which is of an area large enough so that this pressure will cause the main valve 27 to move from its seat 24 and open to communicate the main conduit through the conduit 26, 26' to the exhaust port 12. Fluid will flow through these conduits until pressure has dropped in the main flow passage 11 sufficiently so that the spring 55 will move the valve 50 to its seat at 42 whereupon the fluid in chamber 33 will escape along the sliding surfaces 22, 52 and 53 between the valve 27 and its guiding surfaces with members 15 and 35, so that what pressure there was in this chamber 33 is relieved to the exhaust port and the pressure drops sufficiently constantly so that the spring 31 will move the main valve to closed position with a direct and positive action and without any rebound or cushioning which might tend to permit this valve to reopen or chatter.

The leakages which occur between the main valve along the surface 22 and along the surfaces 52 and 53 and along the surface 51 of the valve 50 are relatively small but sufficient to drop the pressure in the chamber 33 when the valve 50 closes. The leakage through 22 is direct to the exhaust port while the leakages at 52 and 53 are transferred to the exhaust port through the opening 48, and any leakage along the surface 51 may be transferred to the spring chamber and exhaust port through the opening 61.

The auxiliary or control valve has no packing thus reducing friction resisting its action and making it very sensitive so that high pressures may be accurately controlled even with the use of small reduced surfaces. In the case of the main valve, although it is packed as at 41 pressures which are utilized in operating it are relatively large and the tolerances relatively greater.

It will be appreciated that the force exerted by the spring 31 on the main valve will always be such that it will close against any pressure which may be exerted on this narrow edge near its seat. This pressure will also be less than the pressure at which the auxiliary valve is set to open. Thus it will be appreciated that the range of operation of the valve is great, being governed only by these values plus friction of the parts which will be taken into consideration.

I claim:

1. In a relief valve for a fluid system, a housing having a main flow passageway, an exhaust outlet, and a main conduit connecting the two, a sleeve extending into said conduit sealed from said main flow passageway, said sleeve having an opening connecting said passageway with said conduit and a valve seat surrounding said opening, a tubular main reciprocating valve slidably mounted in said sleeve cooperating with said seat and having an enlarged radially outwardly extending portion, a pressure chamber surrounding said valve, one wall of which is a surface of said outwardly extending portion, a tubular guide within said valve providing a conduit from said passageway to said pressure chamber, an abutment to engage the end of the guide which is remote from the main valve, a spring urging said guide toward said abutment and the main valve in the opposite direction toward its seat, said tubular guide providing a valve seat between the pressure chamber and said passageway, an auxiliary valve spring urged into engagement with said valve seat in said tubular guide, said auxiliary valve being exposed to the pressure present in said passageway whereby to be moved from its seat upon a predetermined pressure being present therein and permit the fluid under such pressure to enter said pressure chamber and actuate the main valve, and means for venting said pressure chamber to the exhaust outlet.

2. In a relief valve for a fluid system, a housing having a main flow passageway, an exhaust outlet and a main conduit connecting the two, a sleeve extending into said conduit in spaced relation with the walls thereof and sealed from said main flow passageway, said sleeve having an opening connecting said passageway with said conduit and a valve seat surrounding said opening, a tubular main reciprocating valve slidably mounted in said sleeve cooperating with said seat and having an enlarged radially outwardly extending portion, a pressure chamber surrounding said valve, one wall of which is a surface of said outwardly extending portion, a tubular guide within said valve providing a conduit from said passageway to said pressure chamber, an abutment to engage the end of the guide which is remote from the main valve, a spring urging said guide toward said abutment and the main valve in the opposite direction toward its seat, said tubular guide providing a valve seat between the pressure chamber and said passageway, an auxiliary valve spring urged into engagement with said valve seat in said tubular guide, said auxiliary valve being exposed to the pressure present in said passageway whereby to be moved from its seat upon a predetermined pressure being present therein and permit the fluid under such pressure to enter said pressure chamber and actuate the main valve, there being a leakage between the walls of said pressure chamber and said sleeve for venting said pressure chamber to said outlet.

ROBERT STEVENSON.

REFERENCES CITED

The following references are of record in the file of this patent:

UNITED STATES PATENTS

| Number | Name | Date |
|---|---|---|
| 382,643 | Fox | May 8, 1888 |
| 538,703 | Schreidt | May 7, 1895 |
| 591,013 | Schreidt | Oct. 5, 1897 |
| 715,707 | Tippet | Dec. 9, 1902 |
| 1,229,726 | Ebeling | June 12, 1917 |
| 2,305,519 | Dunmire | Dec. 15, 1942 |
| 2,333,522 | Clifton | Nov. 2, 1943 |
| 2,372,631 | Stevenson | Mar. 27, 1945 |
| 2,388,406 | Haberland | Nov. 6, 1945 |

FOREIGN PATENTS

| Number | Country | Date |
|---|---|---|
| 4,730 | Great Britain | Nov. 17, 1880 |
| 9,722 | Great Britain | Apr. 26, 1902 |